United States Patent
Kagami

(10) Patent No.: US 10,846,133 B2
(45) Date of Patent: Nov. 24, 2020

(54) CONTROL APPARATUS, CONTROL METHOD AND RECORDING MEDIUM ON WHICH CONTROL PROGRAM IS RECORDED

(71) Applicant: FUJITSU LIMITED, Kawasaki (JP)

(72) Inventor: Takahiro Kagami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 16/164,854

(22) Filed: Oct. 19, 2018

(65) Prior Publication Data
US 2019/0138353 A1    May 9, 2019

(30) Foreign Application Priority Data

Nov. 9, 2017  (JP) .................. 2017-216035

(51) Int. Cl.
| | |
|---|---|
| G06F 9/46 | (2006.01) |
| G06F 9/48 | (2006.01) |
| G06F 9/50 | (2006.01) |
| G06F 1/3287 | (2019.01) |

(52) U.S. Cl.
CPC .......... G06F 9/4887 (2013.01); G06F 1/3287 (2013.01); G06F 9/5027 (2013.01)

(58) Field of Classification Search
None
See application file for complete search history.

(56) References Cited

U.S. PATENT DOCUMENTS

| | | | |
|---|---|---|---|
| 2009/0235263 A1* | 9/2009 | Furukawa | G06F 9/5027 718/102 |
| 2010/0205306 A1 | 8/2010 | Kayanuma et al. | |
| 2014/0075222 A1* | 3/2014 | Jackson | G06F 1/329 713/320 |
| 2014/0310720 A1* | 10/2014 | Song | G06F 9/5027 718/104 |
| 2015/0067693 A1* | 3/2015 | Yamazaki | G06F 9/4893 718/103 |
| 2015/0220361 A1* | 8/2015 | Hayashi | G06F 9/485 718/103 |
| 2016/0103714 A1 | 4/2016 | Konishi et al. | |

FOREIGN PATENT DOCUMENTS

| | | |
|---|---|---|
| JP | 2003-256067 | 9/2003 |
| JP | 2010-186255 | 8/2010 |
| JP | 2016-81119 | 5/2016 |

* cited by examiner

*Primary Examiner* — Kenneth Tang
(74) *Attorney, Agent, or Firm* — Fujitsu Patent Center

(57) ABSTRACT

A control apparatus includes a memory and a processor coupled to the memory, wherein the processor is configured to decide whether or not, in a system in which an occupation period of a job is allocated to each of a plurality of calculators so as to operate each of the plurality of calculators, there is a standby job that is to occupy a number of calculators equal to or smaller than a number of one or more end jobs that end in a middle of a first period which is occupied by one or more calculators from among the plurality of calculators, within a second period having a time length equal to or smaller than a remaining time period of the first period, and switch, when deciding that there is no standby job, a mode of the one or more calculators to a power saving mode.

9 Claims, 16 Drawing Sheets

FIG. 9

| JOB ID | CALCULATION NODE NUMBER | EXECUTION TIME PERIOD | PROGRAM NAME |
|---|---|---|---|
| J01 | 2 | L01 | Pro_A |
| J02 | 3 | L02 | Pro_B |
| J03 | 2 | L03 | Pro_C |
| J04 | 3 | L04 | Pro_D |
| ⋮ | ⋮ | ⋮ | ⋮ |

FIG. 10

| CALCULATION NODE ID | STATE AT PRESENT | JOB ID | PROCESS NAME | END TIME OF OCCUPATION PERIOD |
|---|---|---|---|---|
| N01 | OCCUPIED | J01 | PRO_A | E01 |
| N02 | OCCUPIED | J01 | PRO_A | E01 |
| N03 | OCCUPIED | J02 | PRO_B | E02 |
| N04 | OCCUPIED | J02 | PRO_B | E02 |
| N05 | OCCUPIED | J02 | PRO_B | E02 |
| N06 | OCCUPIED | J03 | PRO_C | E03 |
| ⋮ | ⋮ | ⋮ | ⋮ | ⋮ |

CONTROL APPARATUS, CONTROL METHOD AND RECORDING MEDIUM ON WHICH CONTROL PROGRAM IS RECORDED

CROSS-REFERENCE TO RELATED APPLICATION

This application is based upon and claims the benefit of priority of the prior Japanese Patent Application No. 2017-216035, filed on Nov. 9, 2017, the entire contents of which are incorporated herein by reference.

FIELD

The embodiments discussed herein are related to a control apparatus, a control method and a recording medium on which a control program is recorded.

BACKGROUND

In a calculator processing system, for example, a job for which a high processing performance is required is executed.

Examples of the related art include Japanese Laid-open Patent Publication No. 2010-186255, Japanese Laid-open Patent Publication No. 2016-081119 and Japanese Laid-open Patent Publication No. 2003-256067.

SUMMARY

According to an aspect of the embodiments, a control apparatus includes: a memory; and a processor coupled to the memory; wherein the processor is configured to: decide whether or not, in a system in which an occupation period of a job is allocated to each of a plurality of calculators so as to operate each of the plurality of calculators, there is a standby job that is to occupy a number of calculators equal to or smaller than a number of one or more end jobs that end in a middle of a first period which is occupied by one or more calculators from among the plurality of calculators, within a second period having a time length equal to or smaller than a remaining time period of the first period; and switch, when deciding that there is no standby job, a mode of the one or more calculators to a power saving mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 depicts an example of a requested job table;
FIG. 10 depicts an example of a schedule table.

DESCRIPTION OF EMBODIMENTS

In a calculator system in which, for example, a job for which a high processing performance is required is an execution target, a calculator is sometimes operated setting a period within which the calculator is to be occupied by a job in advance. This makes it likely to complete, even if many jobs are accepted, processing of each job within an assumed period.

However, a calculator may not necessarily be executing a job normally. Accordingly, a calculator that is not executing a job sometimes consumes power wastefully.

For example, a technology for suppressing power consumption in a calculator may be provided.

Embodiment 1

Figure 1:
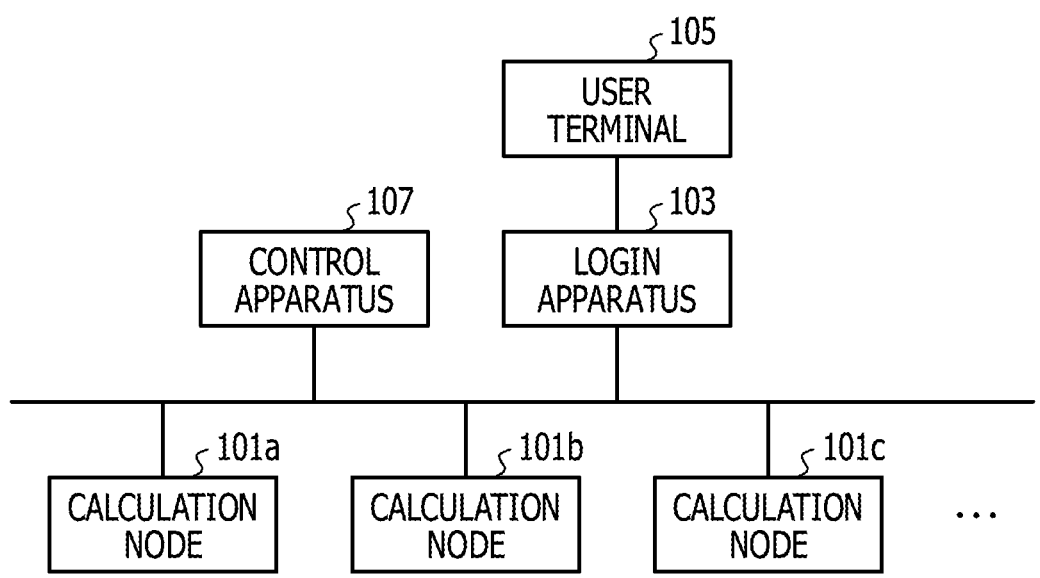
FIG. 1 depicts an example of a calculator system.

FIG. 1 depicts an example of a calculator system. The calculator system includes a plurality of calculation nodes $101a$ to $101c$, a login apparatus 103 and a control apparatus 107. The plurality of calculation nodes $101a$ to $101c$, login apparatus 103 and control apparatus 107 are individually coupled to a network. The calculator system is, for example, a system for high performance computing (HPC).

A user who uses a user terminal 105 would log in to the login apparatus 103 and request the calculator system to execute an application. This application is hereinafter referred to as job. The user would designate, in the request, the number for calculation nodes 101 to be used for the job and an execution time period of the job. Where a plurality of calculation nodes 101 are used, the calculation nodes 101 perform parallel processing.

The login apparatus 103 notifies the control apparatus 107 of a calculation node number and an execution time period to be used in each of the requested jobs. It is assumed that, in the present example, a calculation node number and an execution time period for each job are conveyed in the form of a requested job table hereinafter described.

The control apparatus 107 performs scheduling of the jobs to allocate the jobs to the calculation nodes 101. Periods within which the jobs are to occupy the calculation nodes 101 (hereinafter referred to as occupation periods) are set.

Figure 2:
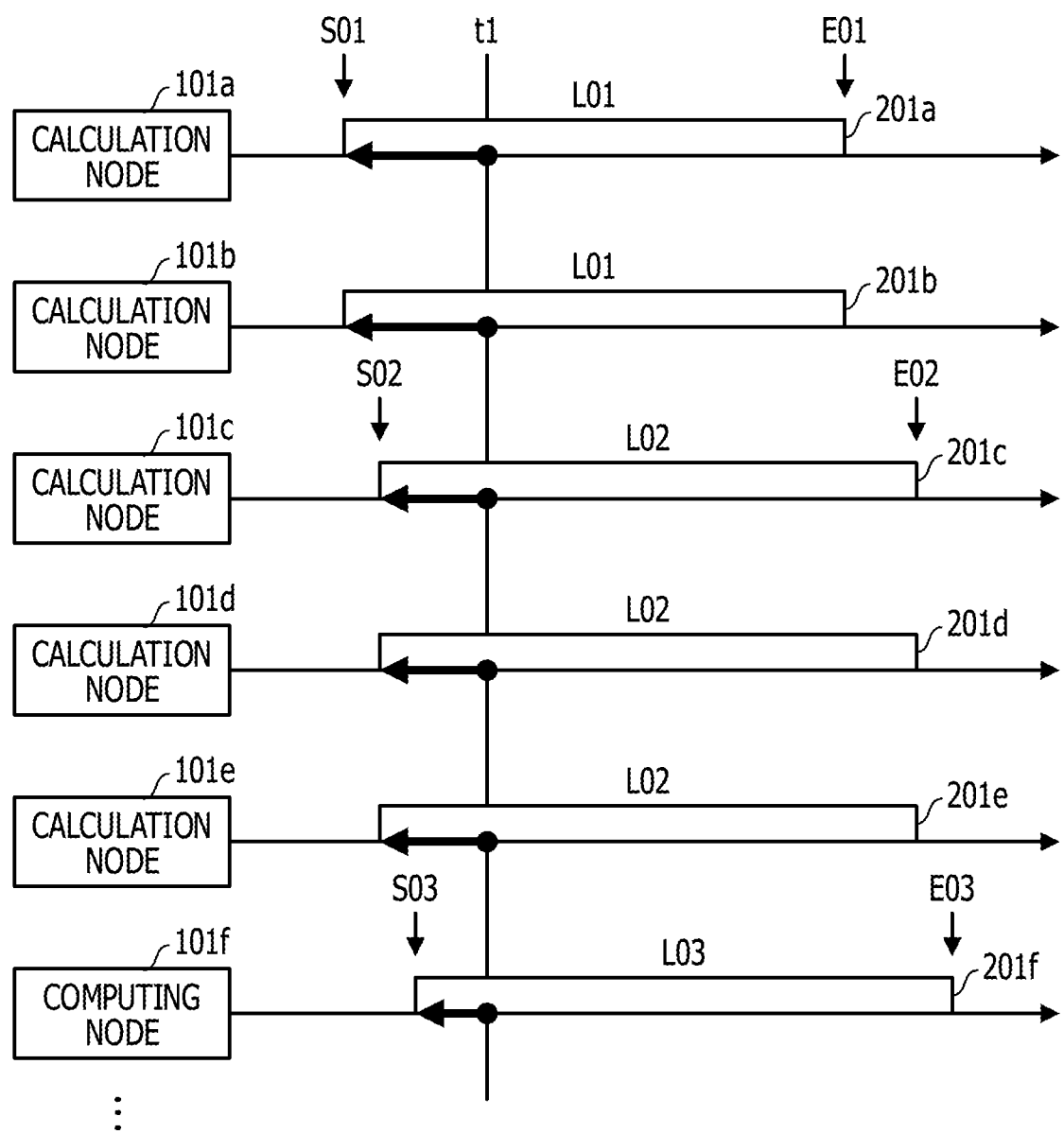
FIG. 2 depicts an example of a schedule.

FIG. 2 depicts an example of a schedule. In this example, a schedule relating to the calculation nodes $101a$ to $101f$ is depicted. Time lapse is indicated in the rightward direction. Occupation periods $201a$ to $201f$ are periods within which the calculation nodes $101a$ to $101f$ are occupied by the jobs, respectively. Within the occupation periods 201, the calculation nodes 101 execute the jobs allocated thereto. However, it is assumed that, in this example, execution of a job sometimes ends before an end point of time of the occupation period 201 comes.

The calculation node $101a$ within the occupation period $201a$ and the calculation node $101b$ within the occupation period $201b$ are occupied by a same job. The calculation node number by the job is 2, and the execution time period of the job, for example, the length of the occupation periods 201 by the job is L01. The start time of the occupation periods 201 by the job is S01, and the end time of the occupation periods 201 by the job is E01.

The calculation node 101c within the occupation period 201c, the calculation node 101d within the occupation period 201d and the calculation node 101e within the occupation period 201e are occupied by a same job. The calculation node number by the job is 3, and the execution time period of the job, for example, the length of the occupation periods 201 by the job is L02. The start time of the occupation periods 201 by the job is S02, and the end time of the occupation periods 201 by the job is E02.

The calculation node 101f within the occupation period 201f is occupied solely by a job. The calculation node number in the job is 1, and the execution time period of the job, for example, the length of the occupation period 201 by the job, is L03. The start time of the occupation period 201 by the job is S03, and the end time of the occupation period 201 by the job is E03.

The calculation node 101a and the calculation node 101b start execution of the respective jobs at time S01. At time t1, execution of the job is ongoing. It is to be noted that an arrow mark at a left end indicates start of execution of a program, and a round mark at a right end indicates continuation of execution of a program.

The calculation node 101c, calculation node 101d and calculation node 101e start execution of the respective jobs at time S02. At time t1, the execution of the job is ongoing.

The calculation node 101f starts execution of the job at time S03. At time t1, the execution of the job is ongoing.

A situation at time t2 is described with reference to FIG. 3. The calculation node 101c, calculation node 101d, calculation node 101e and calculation node 101f keep the execution of the respective jobs ongoing at time t2. On the other hand, the calculation node 101a and the calculation node 101b have already ended the execution of the job at time t2. It is to be noted that an arrow mark at a right end indicates an end of execution of the program.

The jobs that occupy the calculation node 101a and the calculation node 101b have ended at a stage earlier than the end time E01 of the occupation periods 201. For example, the job came to end midway of the occupation periods 201. A remaining time period T01 by the end at the early stage is a difference of the end time t2 of the job from the end time E01 of the occupation periods 201.

In the case where a job ends at an early stage in this manner, re-scheduling is performed, and a job in a standby state is sometimes allocated to the remaining time period.

Figure 3:
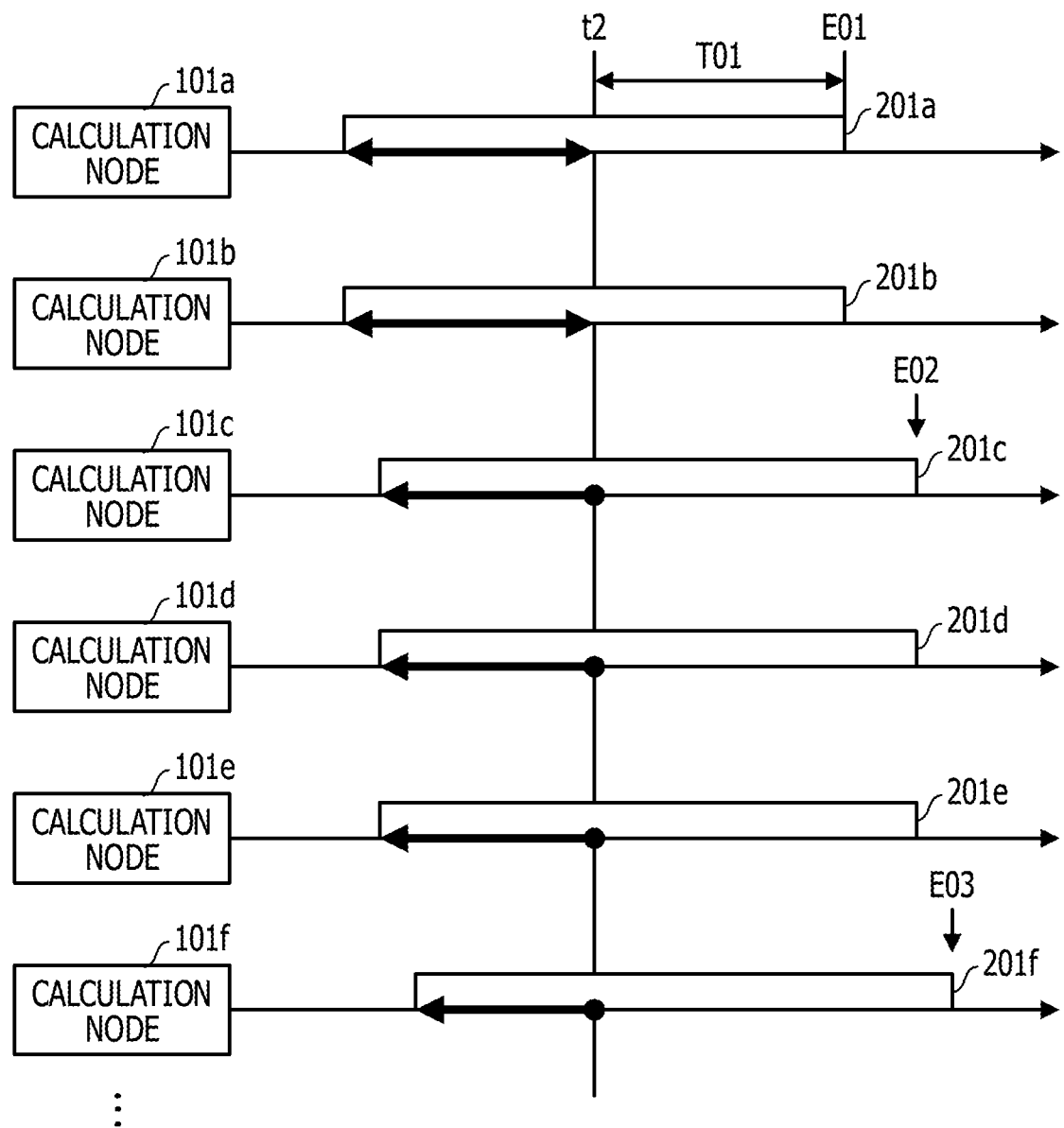
FIG. 3 depicts an example of a schedule.
Figure 4:
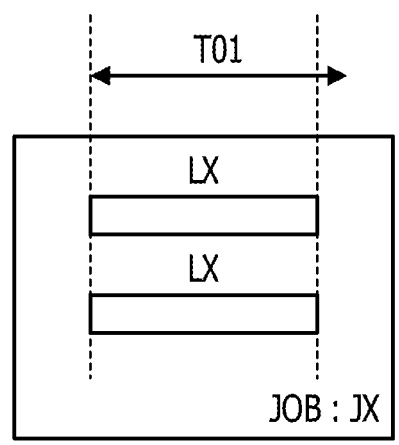
FIG. 4 depicts an example of a job.

A job allocated to the remaining time period T01 depicted in FIG. 3 is described with reference to FIG. 4. The calculation node number required by a job: ix depicted in FIG. 4 is 2, and the execution time period of the job is LX. The execution time period LX is shorter than the remaining time period T01.

In this manner, in the case where the calculation node number for a standby job is equal to or smaller than the node number in calculation for a job that ends at an early stage and the execution time period of the standby job is equal to or shorter than the remaining time period, there is the possibility that the standby job may be allocated to the remaining time period of the job that ends at an early stage.

Figure 5:
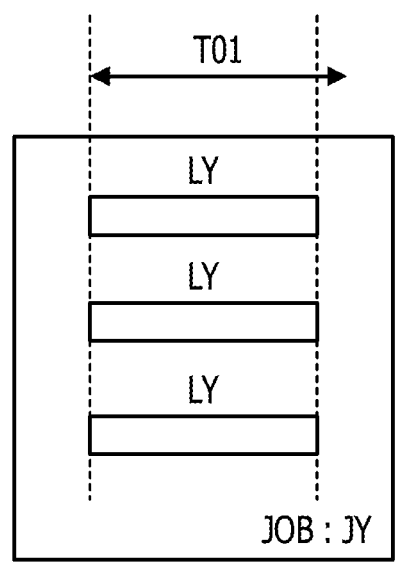
FIG. 5 depicts another example of a job.

Now, a job that is not allocated to the remaining time period T01 depicted in FIG. 3 is described with reference to FIG. 5. The execution time period of a job: JY depicted in FIG. 5 is LY. The execution time period LY is shorter than the remaining time period T01. However, the calculation node number required by the job is 3 and is greater than the node number for calculation of the job that ends at an early stage depicted in FIG. 3.

In the case where the calculation node number for a standby job is greater than the node number for calculation of a job that ends at an early stage in this manner, there is no possibility that the standby job may be allocated to the remaining time period of the job that ends at an early stage.

Figure 6:
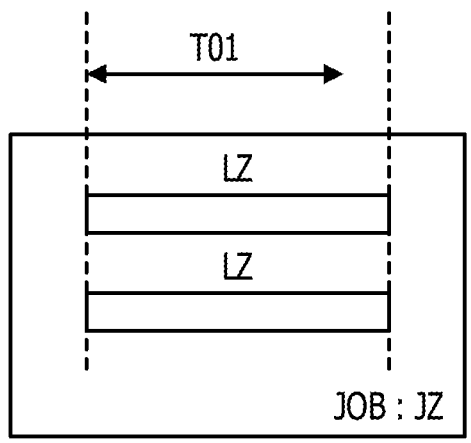
FIG. 6 depicts a further example of a job.

FIG. 6 depicts another example of a job that is not allocated to the remaining time period T01 depicted in FIG. 3. The calculation node number required by a job: JZ depicted in FIG. 6 is 2 and is substantially equal to the node number for calculation in the job that ends at an early stage depicted in FIG. 3. However, the execution time period LZ for the job is longer than the remaining time period T01.

In the case where the execution time period for a standby job is longer than the remaining time period for a job that ends at an early stage in this manner, there is no possibility that the standby job may be allocated to the remaining time period for a job that ends at an early stage.

In the case where there is no possibility that some standby job may be allocated to the remaining time period of a job that ends at an early stage, since the calculation nodes 101 do not execute a job within the remaining time period, the power consumption within the time period is wasteful.

In the present embodiment, in the case where a plurality of jobs are in a standby state, if there is no possibility that any one of the standby jobs may be allocated to the remaining time period of a job that ends at an early stage, the calculation nodes 101 that have executed the job that ends at an early stage are caused to transit to a power saving mode. On the other hand, if there is the possibility that at least one of standby jobs may be allocated to the remaining time period of a job that ends at an early stage, the calculation nodes 101 that have executed the job that ends at an early stage are not caused to transit to the power saving mode. The description of an overview of the present embodiment ends therewith.

Figure 7:
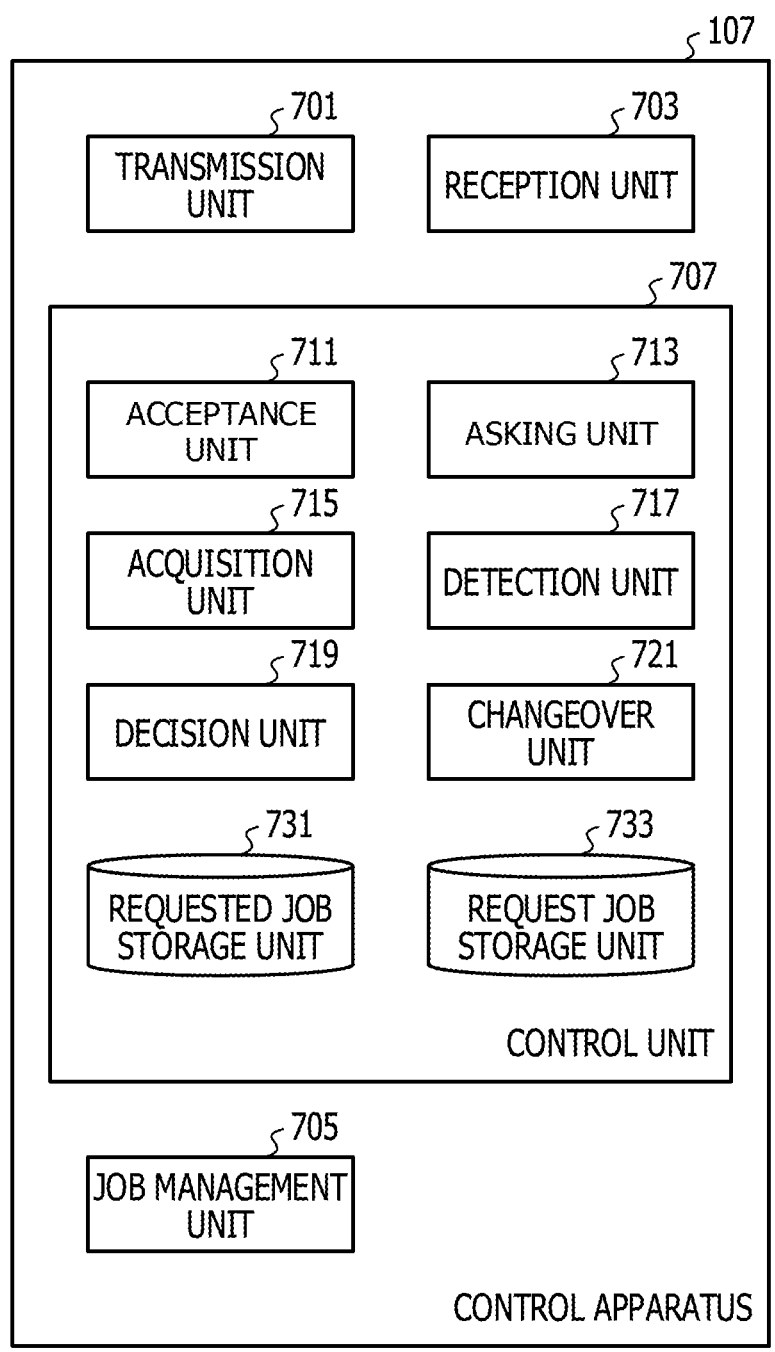
FIG. 7 depicts an example of a module configuration of a control apparatus.

In the following, operation of the control apparatus 107 is described. FIG. 7 depicts an example of a configuration of the control apparatus 107. The control apparatus 107 includes a transmission unit 701, a reception unit 703, a job management unit 705 and a control unit 707.

The transmission unit 701 transmits various data. The reception unit 703 receives various data. The job management unit 705 performs management of jobs. For example, in scheduling of the jobs, the job management unit 705 allocates a new job to some of the calculation nodes 101 and sets an occupation period 201 for the calculation nodes 101. The job management unit 705 causes the calculation nodes 101 to execute the respective jobs in accordance with the schedule. The control unit 707 passes information of the job requested from the user to the job management unit 705 and controls changeover of the mode of the calculation nodes 101.

The control unit 707 includes an acceptance unit 711, an asking unit 713, an acquisition unit 715, a detection unit 717, a decision unit 719, a changeover unit 721, a requested job storage unit 731 and a schedule storage unit 733.

The acceptance unit 711 accepts a requested job table. The requested job table is hereinafter described with reference to FIG. 9. The asking unit 713 passes the requested job table to the job management unit 705 and asks the job management unit 705 for scheduling. The acquisition unit 715 acquires data (for example, a schedule table) from the job management unit 705. The schedule table is hereinafter described with reference to FIG. 10.

The detection unit 717 detects a job that ends at an early stage in a detection process. The decision unit 719 performs a decision process to decide whether or not there is the possibility that a standby job may be allocated to a remaining time period of the job that ends at an early stage. The changeover unit 721 performs a changeover process to change over the mode of the calculation node 101 to a power saving mode.

The requested job storage unit 731 stores a requested job table. The schedule storage unit 733 stores a schedule table.

The transmission unit 701, reception unit 703, job management unit 705, control unit 707, acceptance unit 711, asking unit 713, acquisition unit 715, detection unit 717, decision unit 719 and changeover unit 721 described above are implemented using hardware resources (for example, those depicted in FIG. 16) and a program that causes a central processing unit (CPU) 2503 to execute a process described blow.

Figure 16:
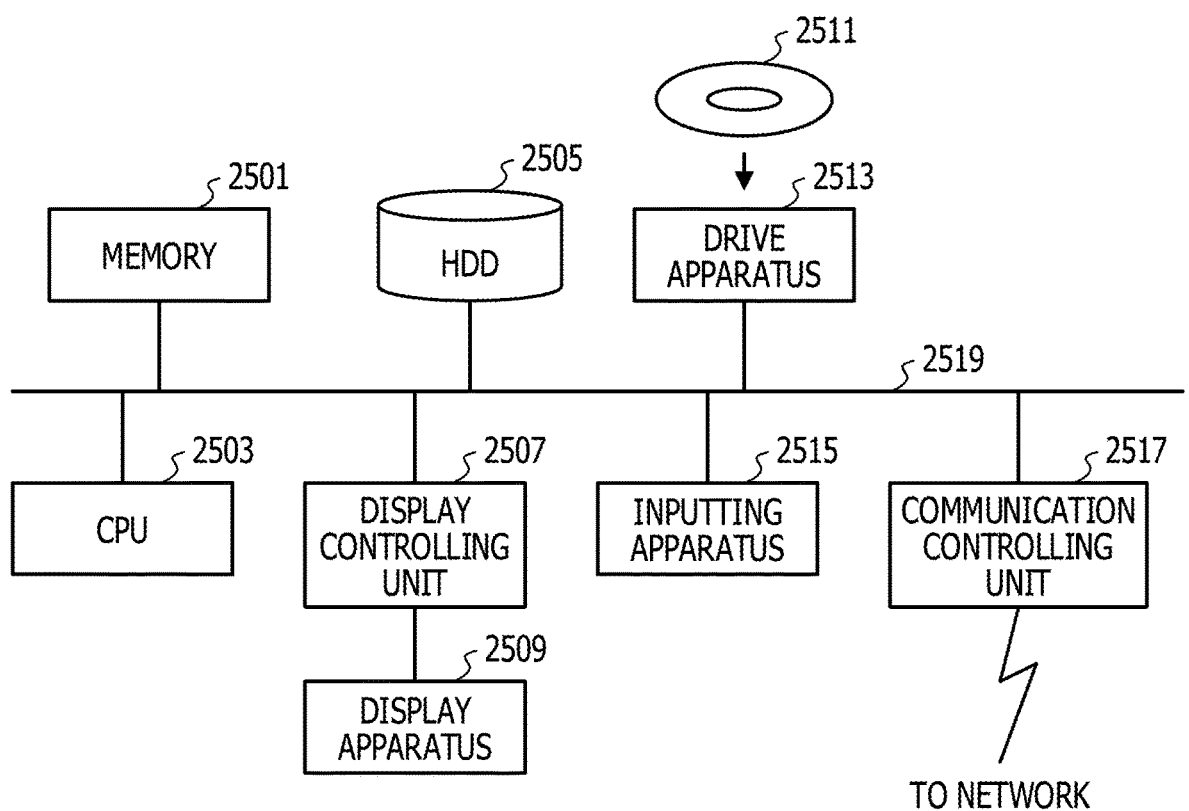
FIG. 16 depicts an example of functional blocks of a computer.

The requested job storage unit 731 and the schedule storage unit 733 described above are implemented using hardware resources (for example, those depicted in FIG. 16).

Figure 8:
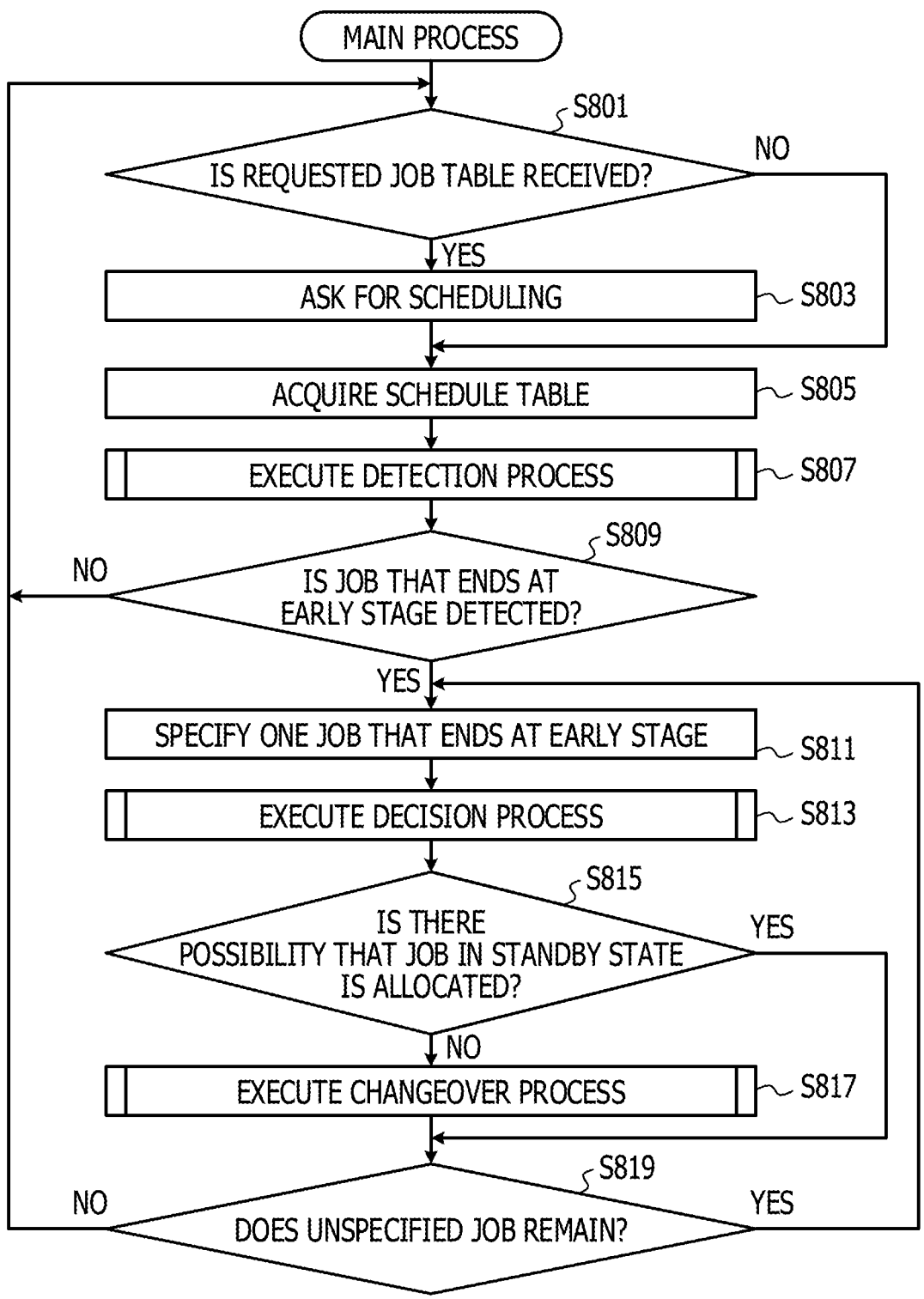
FIG. 8 depicts an example of a main process.

Now, the process by the control unit 707 is described. FIG. 8 depicts a main processing flow. The acceptance unit 711 decides whether or not the reception unit 703 has received a requested job table from the login apparatus 103 (S801).

In the case where it is decided that the reception unit 703 has received a requested job table from the login apparatus 103, the acceptance unit 711 accepts and stores the requested job table into the requested job storage unit 731.

FIG. 9 depicts an example of a requested job table. The requested job table in this example includes records corresponding to requested jobs. A record of the requested job table includes a field in which a job identification (ID) is placed, another field in which a calculation node number is placed, a further field in which an execution time period is placed, and a still further field for a program name.

The job ID identifies a requested job. The calculation node number is the number for calculation nodes 101 occupied by the requested job. The execution time period is a period of time secured in order to execute the job and corresponds to a length of a period within which the job occupies the calculation nodes 101. The program name is a name of a program executed as the job. In the case where a plurality of programs are used to execute the program, a plurality of program names may be placed.

Referring back to FIG. 8, the asking unit 713 passes the requested job table to the job management unit 705 and asks the job management unit 705 for scheduling (S803). The job management unit 705 performs scheduling such that the jobs included in the requested job table are added to the schedule. As described above, the job management unit 705 performs also control for causing the calculation nodes 101 to execute the job in accordance with the schedule.

On the other hand, in the case where it is decided at S801 that the reception unit 703 has not received a requested job table, the processing advances directly to S805.

The acquisition unit 715 acquires a schedule table from the job management unit 705 (S805).

FIG. 10 depicts an example of a schedule table. The schedule table in the present example includes records corresponding to the calculation nodes 101. A record of the schedule table includes a field in which a calculation node ID is placed, another field in which a state at present is placed, a further field in which a job ID is placed, a still further field in which a process name is placed, and a yet further field in which end time of the occupation period 201 is placed. It is to be noted that, in the present example, a record relating to any calculation node 101 that is in a power saving mode at the present point of time is not provided.

The calculation node ID identifies a calculation node 101. The state at present identifies whether the calculation node 101 is in a state in which it is occupied (for example, "occupied") or the calculation node 101 is in a state in which it is not occupied (for example, "standby"). The job ID identifies the job that occupies the calculation node 101 in the case where the state at present of the calculation node 101 is an occupied state. The process name is a name of a process of the job being executed by the calculation node 101. The end time of the occupation period 201 specifies an end point of time of the period within which the calculation node 101 is occupied.

Referring back to FIG. 8, the detection unit 717 executes a detection process (S807). The detection unit 717 detects any job that ends at an early stage in the detection process.

Figure 11:
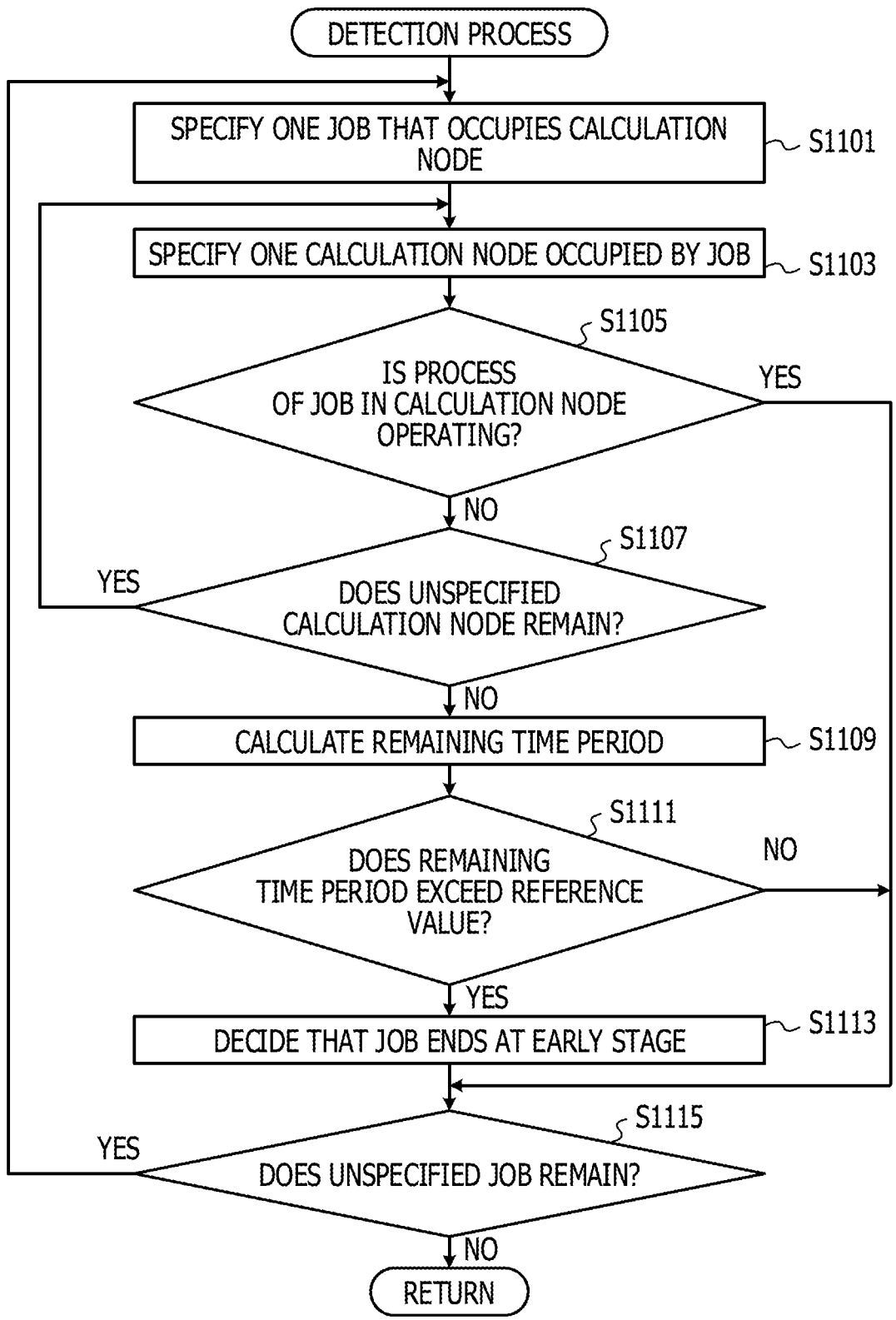
FIG. 11 depicts an example of a detection process.

FIG. 11 depicts a flow of a detection process. The detection unit 717 specifies one job that occupies a calculation node 101 (S1101). For example, the detection unit 717 specifies one job from among jobs set in records in which the state at present is an occupied state in the schedule table.

The detection unit 717 specifies one of the calculation nodes 101 occupied by the job (S1103). For example, the detection unit 717 specifies one of the records in which the ID of the job is set in the schedule table.

The detection unit 717 decides whether or not a process of the job is operating in the calculation node 101 (S1105). For example, the detection unit 717 specifies a process name corresponding to the calculation node 101 in the schedule table. The detection unit 717 acquires a list of processes that are operating in the calculation node 101 from an operating system of the calculation node 101 and decides whether or not the process name is included in the list. In the case where the process name is not included in the list, the detection unit 717 decides that a process of the job is not operating. On the other hand, in the case where the process name is included in the list, the detection unit 717 decides that a process of the job is operating.

In the case where a process of the job is operating, the job does not end as yet. In this case, the processing returns to S1115.

On the other hand, in the case where a process of the job is not operating, the detection unit 717 decides at S1103 whether or not there remains an unspecified calculation node 101 (S1107). In the case where it is decided that there remains an unspecified calculation node 101, the processing returns to S1103 to repeat the processes described above.

On the other hand, in the case where it is decided at S1103 that there does not remain an unspecified 101, this signifies that the job ends already. In this case, the detection unit 717 calculates a remaining time period (S1109). For example, the detection unit 717 subtracts the present point of time from the end time of the occupation period 201 to determine the remaining time period.

If power loss required for transition of a mode is taken into consideration, in the case where the remaining time period is short, the significance in transition to the power saving mode is small. Accordingly, in this example, in the case where the remaining time period is equal to or smaller than a reference value, the decision of an end at an early stage is not made. To this end, the detection unit 717 decides whether or not the remaining time period exceeds the reference value (S1111).

In the case where the remaining time period does not exceed the reference value, the processing directly advances to S1115. On the other hand, in the case where the remaining time period exceeds the reference value, the detection unit 717 decides that the job has ended at an early stage (S1113).

It is to be noted that, even in the case where the remaining time period is short, transition to the power saving mode may be performed. In this case, in the case where it is decided at S1107 that there remains no unspecified calculation node 101, the processing may be advanced to S1113 omitting S1109 and S1111.

The detection unit 717 decides at S1101 whether or not there remains an unspecified job (S1115). In the case where it is decided that there remains an unspecified job, the processing returns to S1101 to repeat the processes described above. On the other hand, in the case where there remains no unspecified job, the detection process is ended and the processing returns to the main process of the calling source.

Referring back to FIG. 8, the decision unit 719 branches the processing depending upon whether or not a job that has ended at an early stage is detected in the detection process (S809). In the case where a job that has ended at an early stage is not detected, the processing returns to S801 to repeat the processes described above.

On the other hand, in the case where a job that has ended at an early stage is detected, the decision unit 719 decides one job that has ended at an early stage (S811). In this example, it is assumed that a plurality of jobs that ends at an early stage may be detected. The decision unit 719 executes the decision process (S813). The decision unit 719 decides in the decision process whether or not there is the possibility that a job in a standby state may be allocated to the remaining time period of the job that ends at an early stage.

Figure 12:
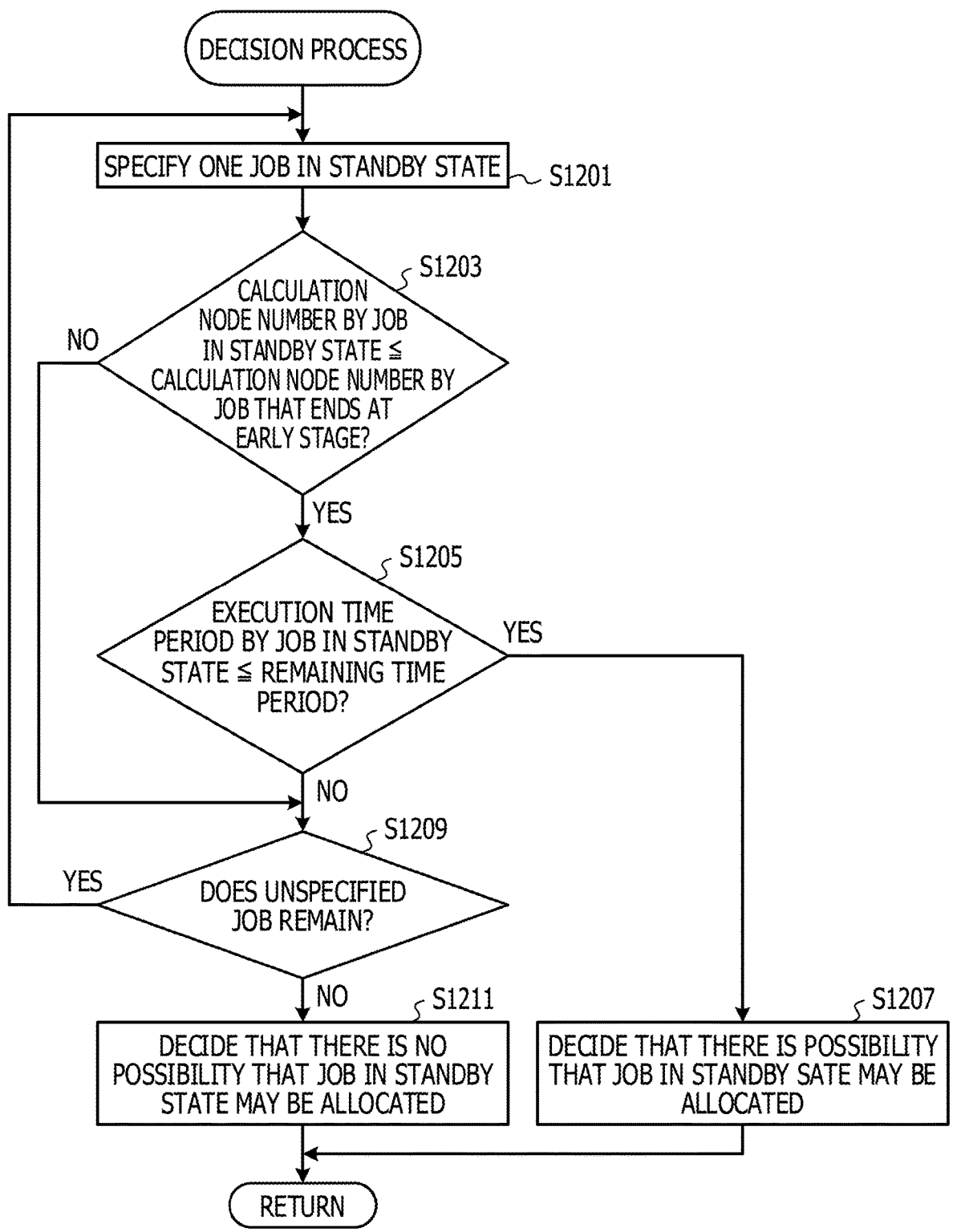
FIG. 12 depicts an example of a decision process.

FIG. 12 depicts a flow of a decision process. The decision unit 719 specifies one standby job (S1201). For example, the decision unit 719 specifies, from among the job IDs included in the requested job table, one job ID that is not associated with an unoccupied state as yet in the schedule table. As an alternative, the acquisition unit 715 may acquire information relating to jobs in a standby state from the job management unit 705 (for example, the job ID and the calculation node number and the execution time period of the job) from the job management unit 705.

The decision unit 719 decides whether or not the calculation node number for the standby job is equal to or smaller than the calculation node number in the job that ends at an early stage specified at S811 of FIG. 8 (S1203).

In the case where it is decided that the calculation node number in the standby job is equal to or smaller than the calculation node number for the job that ends at an early stage, the decision unit 719 decides whether or not the execution time period of the standby job is equal to or shorter than the remaining time period (S1205).

In the case where it is decided that the execution time period of the standby job is equal to or shorter than the remaining time period, the decision unit 719 decides that there is the possibility that the standby job may be allocated to the remaining time period of the job that ends at an early stage (S1207).

On the hand, in the case where it is decided at S1203 that the calculation node number for a standby job is greater than the node number for calculation of a job that ends at an early stage, the processing advances to S1209. Also in the case where it is decided at S1205 that the execution time period of the standby job is longer than the remaining time period, the processing advances to S1209. The decision unit 719 decides whether or not there remains an unspecified job at S1201 (S1209).

In the case where it is decided that there remains an unspecified job, the processing returns to S1201 to repeat the processes described above. On the other hand, in the case where it is decided that there remains no unspecified job, the decision unit 719 decides that there is no possibility that a standby job may not be allocated to the remaining time period of the job that ends at an early stage (S1211). The decision process ends therewith, and the processing returns to the main process of the calling source.

Referring back to FIG. 8, the changeover unit 721 branches the processing depending upon whether or not there is the possibility that a standby job may be allocated to the remaining time period of a job that ends at an early stage (S815). In the case where there is the possibility that a standby job may be allocated to the remaining time period of a job that ends at an early stage, the processing advances directly to S819.

On the other hand, in the case where there is no possibility that a standby job may be allocated to the remaining time period of a job that ends at an early stage, the changeover unit 721 executes a changeover process (S817). The changeover unit 721 changes the mode of the calculation nodes 101 occupied by the job that ends at an early stage specified at S811 to the power saving mode in the changeover process.

Figure 13:
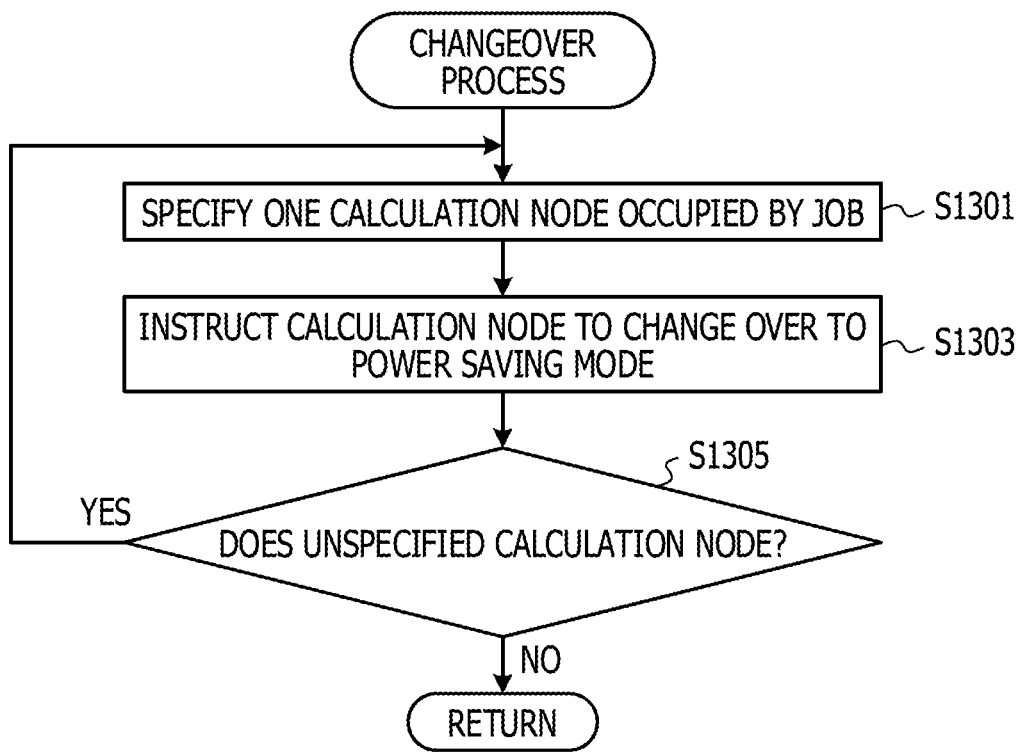
FIG. 13 depicts an example of a changeover process.

FIG. 13 depicts a flow of a changeover process. The changeover unit 721 specifies one calculation node 101 occupied by the job that ends at an early stage specified at S811 of FIG. 8 based on the schedule table (S1301).

The changeover unit 721 instructs the calculation node 101 to change over its mode to the power saving mode (S1303). The changeover unit 721 decides at S1301 whether or not there remains an unspecified calculation node 101 (S1305).

In the case where it is decided that there remains an unspecified 101, the processing returns to S1301 to repeat the processes described hereinabove. On the other hand, in the case where it is decided that there remains no unspecified calculation node 101, the changeover process ends and the processing returns to the main process of the calling source.

Referring back to FIG. 8, the decision unit 719 decides whether or not there remains a job that ends at an early stage unspecified at S811 (S819). In the case where it is decided that there remains an unspecified job that ends at an early stage, the processing returns to S811 to repeat the processes described above.

On the other hand, in the case where it is decided that there remains no unspecified job that ends at an early stage, the processing returns to S801 to repeat the processes described above.

With the present embodiment, power consumption in the calculators may be suppressed.

Embodiment 2

While the embodiment described above is a directed to an example, in the control unit 707, in which a job that ends at an early stage is detected, the control unit 707 may alternatively acquire information relating to a job that ends at an early stage from the job management unit 705.

Figure 14:
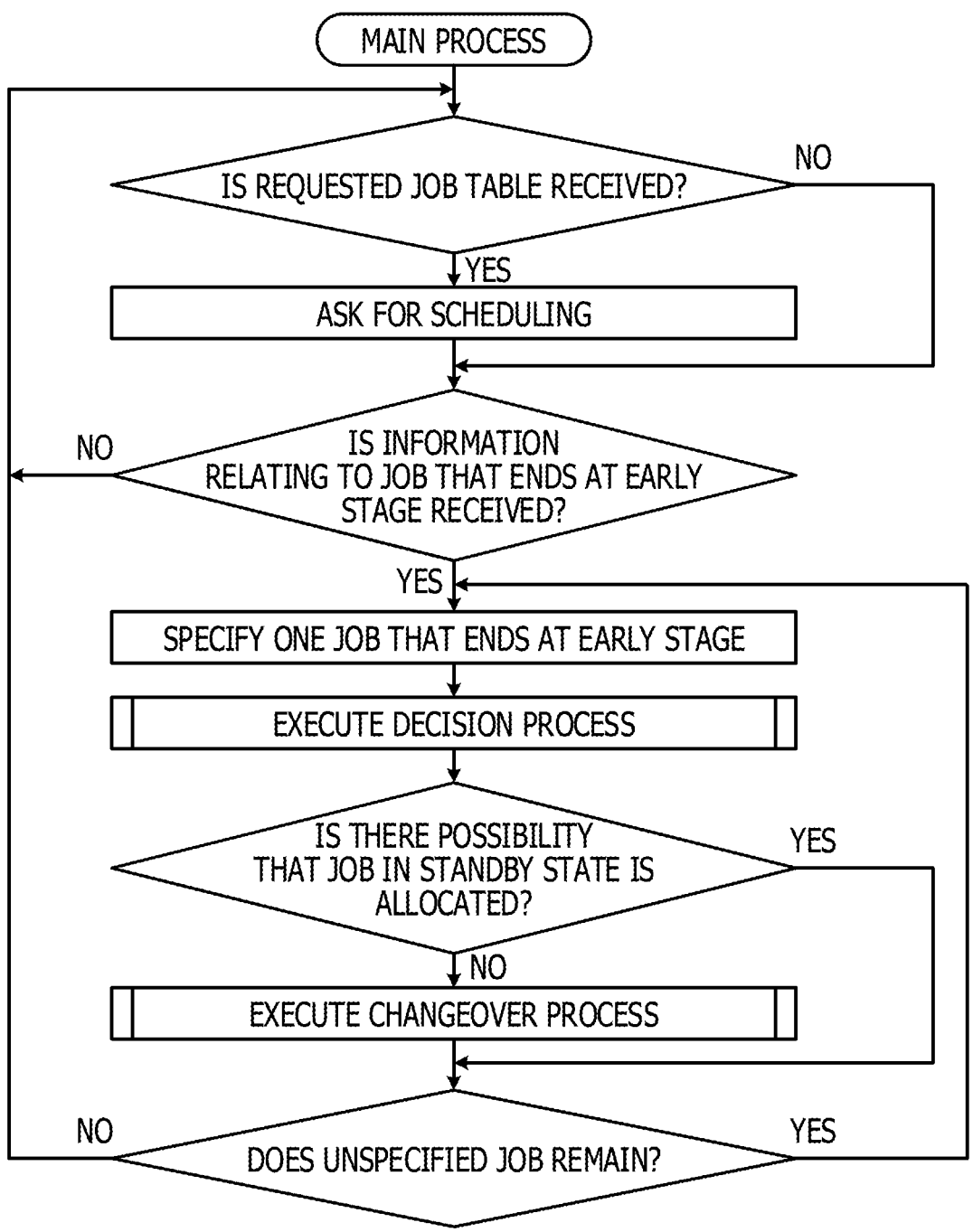
FIG. 14 depicts another example of a main process.

FIG. 14 depicts a main processing flow in an embodiment 2. Processes at S801 to S803 are similar to those in the case of FIG. 8.

The acquisition unit 715 decides whether or not information relating to a job that ends at an early stage is acquired from the job management unit 705 (S1401). The information relating to a job that ends at an early stage is, for example, an ID of a job that ends at an early stage. The job management unit 705 performs a process corresponding, for example, to the detection process described hereinabove in connection with the embodiment 1, and notifies, when a job that ends at an early stage is detected, the control unit 707 of information relating to the job that ends at an early stage.

In the case where information relating to a job that ends at an early stage is not acquired as yet, the processing returns to S801 to repeat the processes described above. On the other hand, in the case where information relating to a job that ends at an early stage is acquired, the processing returns to S811. The processes at S811 to S819 are similar to those in the case of FIG. 8.

With the present embodiment, power consumption in the calculators may be suppressed similarly as in the embodiment 1. It is to be noted that the burden on the control unit 707 may be reduced.

Embodiment 3

While the embodiments described above are directed to an example in which the control unit 707 and the job management unit 705 are provided in the control apparatus 107, the job management unit 705 may be provided in an apparatus other than the control apparatus 107.

Figure 15:
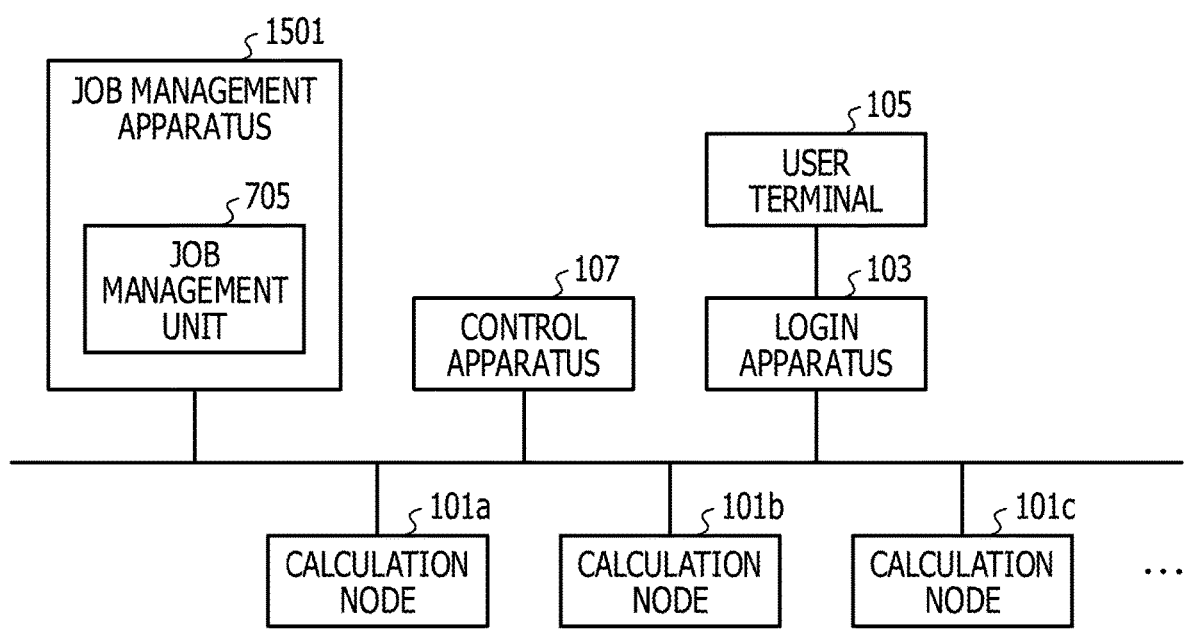
FIG. 15 depicts an example of a configuration of a calculator system.

FIG. 15 depicts an example of a configuration of a calculator system according to an embodiment 3. A job management apparatus 1501 is provided on a network. The job management apparatus 1501 includes the job management unit 705.

The control unit 707 performs transfer of data to and from the job management unit 705 through the network. In the case where the control unit 707 is to receive data from the job management unit 705, it receives the data from the job management apparatus 1501 through the network. In the case were the control unit 707 is to pass data to the job management unit 705, it transmits the data to the job management apparatus 1501 through the network.

With the present embodiment, power consumption in the calculator may be suppressed similarly as in the embodiment 1.

Although the embodiments of the present technology have been described, the present technology is not limited them. For example, the functional block configuration described may not coincide with a program module configuration.

The configuration of each storage region described hereinabove is an example, and each storage region may not have such a configuration as described above. Further, also in a processing flow, if a processing result does not vary, the order of processes may be changed or a plurality of processes may be executed in parallel.

The control apparatus 107 described above is a computer apparatus and is configured such that, as depicted in FIG. 16, a memory 2501, a CPU 2503, a hard disk drive (HDD) 2505, a display controlling unit 2507 coupled to a display apparatus 2509, a drive apparatus 2513 for a removable disk 2511, an inputting apparatus 2515 and a communication controlling unit 2517 for coupling to a network and are coupled to each other by a bus 2519. An operating system (OS) and an application program for carrying out the processes in a working example are stored in the HDD 2505 such that, when they are to be executed by the CPU 2503, they are read out from the HDD 2505 into the memory 2501. The CPU 2503 controls the display controlling unit 2507, communication controlling unit 2517 and drive apparatus 2513 in response to the processing substance of the application program to perform given operation. Although data during processing are stored principally into the memory 2501, they may otherwise be stored into the HDD 2505. In a working example of the present technology, the application program for carrying out the processes described hereinabove is stored into and distributed together with a computer-readable removable disk 2511 and then installed from the drive apparatus 2513 into the HDD 2505. The application program may otherwise be installed into the HDD 2505 through a network such as the Internet and the communication controlling unit 2517. Such a computer apparatus as described above implements such various functions as described above through organic cooperation of such hardware as the CPU 2503, memory 2501 and so forth described above and programs such as the OS and an application program.

The embodiments of the present technology described above may be summarized in the following manner.

A control apparatus according to the present embodiments is a control apparatus included in a system in which an occupation period for a job is allocated to each of a plurality of calculators, the control apparatus including (A) a decision unit that decides whether or not there is a standby job that is to occupy the number for calculators equal to or smaller than the number for jobs that end in the middle of a first period, within which the jobs occupy one or more calculators, within a second period having a time length equal to or smaller than a remaining time period of the first period; and (B) a changeover unit that changes over, where it is decided that there is no standby job, the mode of the one or more calculators to a power saving mode.

With the control apparatus, the power consumption of the calculators may be suppressed.

The control apparatus may further include a detection unit that detects the jobs that end in the middle of the first period within which the one or more calculators are occupied.

With the control apparatus, the processing load on the job management unit that performs scheduling of jobs may be reduced.

The control apparatus may further include an acquisition unit that acquires information of the jobs that end in the middle of the first period, within which the one or more calculators are occupied, from a job management unit that performs scheduling of the jobs.

With the control apparatus, the processing load on the control apparatus may be reduced.

A program for causing a computer to execute the processes of the control apparatus described above may be created, and the program may be stored into a computer-readable storage medium such as a flexible disk, a compact disc read-only memory (CD-ROM), a magneto-optical disk, a semiconductor memory or a hard disk or into a storage device. It is to be noted that intermediate processing results are temporarily stored into a storage device such as a main memory or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control apparatus comprising:
a memory; and
a processor coupled to the memory, the processor is configured to:
detect, in a system in which an occupation period of a job is allocated to each of a plurality of calculators so as to operate each of the plurality of calculators, one or more end jobs which are executed by one or more calculators from among the plurality of calculators in a first occupation period and executions of which end in a middle of the first occupation period;
calculate a remaining time period which is not used by the executions of the one or more end jobs in the first occupation period;
decide there is a standby job which is to be executed within a second occupation period having a time length equal to or smaller than the remaining time period of the first occupation period; and
switch, when deciding that there is no standby job, a mode of the one or more calculators to a power saving mode.

2. The control apparatus according to claim 1, wherein the processor decides whether the remaining time period exceeds a reference value and decides there is the standby job when the remaining time period exceeds the reference value.

3. The control apparatus according to claim 1, wherein the processor acquires information of the one or more end jobs from a schedule table that indicates a situation of the plurality of calculators.

4. A control method comprising:
detecting, by a computer, in a system in which an occupation period of a job is allocated to each of a plurality of calculators so as to operate each of the plurality of calculators, one or more end jobs which are executed by one or more calculators from among the plurality of calculators in a first occupation period and executions of which end in a middle of the first occupation period;
calculating a remaining time period which is not used by the executions of the one or more end jobs in the first occupation period;
deciding there is a standby job which is to be executed within a second period having a time length equal to or smaller than the remaining time period of the first period; and
switching, when deciding that there is no standby job, a mode of the one or more calculators to a power saving mode.

5. The control method according to claim 4, further comprising:
deciding whether the remaining time period exceeds a reference value; and
deciding there is the standby job when the remaining time period exceeds the reference value.

6. The control method according to claim 4, further comprising: acquiring information of the one or more end jobs from a schedule table that indicates a situation of the plurality of calculators.

7. A non-transitory computer-readable recording medium recording a program which causes a computer to execute a processing, the processing comprising:
detecting, in a system in which an occupation period of a job is allocated to each of a plurality of calculators so as to operate each of the plurality of calculators, one or more end jobs which are executed by one or more calculators from among the plurality of calculators in a first occupation period and executions of which end in a middle of the first occupation period;
calculating a remaining time period which is not used by the executions of the one or more end jobs in the first occupation period;
deciding there is a standby job which is to be executed within a second occupation period having a time length equal to or smaller than the remaining time period of the first occupation period; and
switching, when deciding that there is no standby job, a mode of the one or more calculators to a power saving mode.

8. The non-transitory computer-readable recording medium according to claim 7, further comprising:
deciding whether the remaining time period exceeds a reference value; and
deciding there is the standby job when the remaining time period exceeds the reference value.

9. The non-transitory computer-readable recording medium according to claim 7, further comprising: acquiring information of the one or more end jobs from a schedule table that indicates a situation of the plurality of calculators.

* * * * *